Dec. 8, 1936.  L. D. BARNER  2,063,655
VALVE MECHANISM
Filed April 18, 1933   2 Sheets-Sheet 1
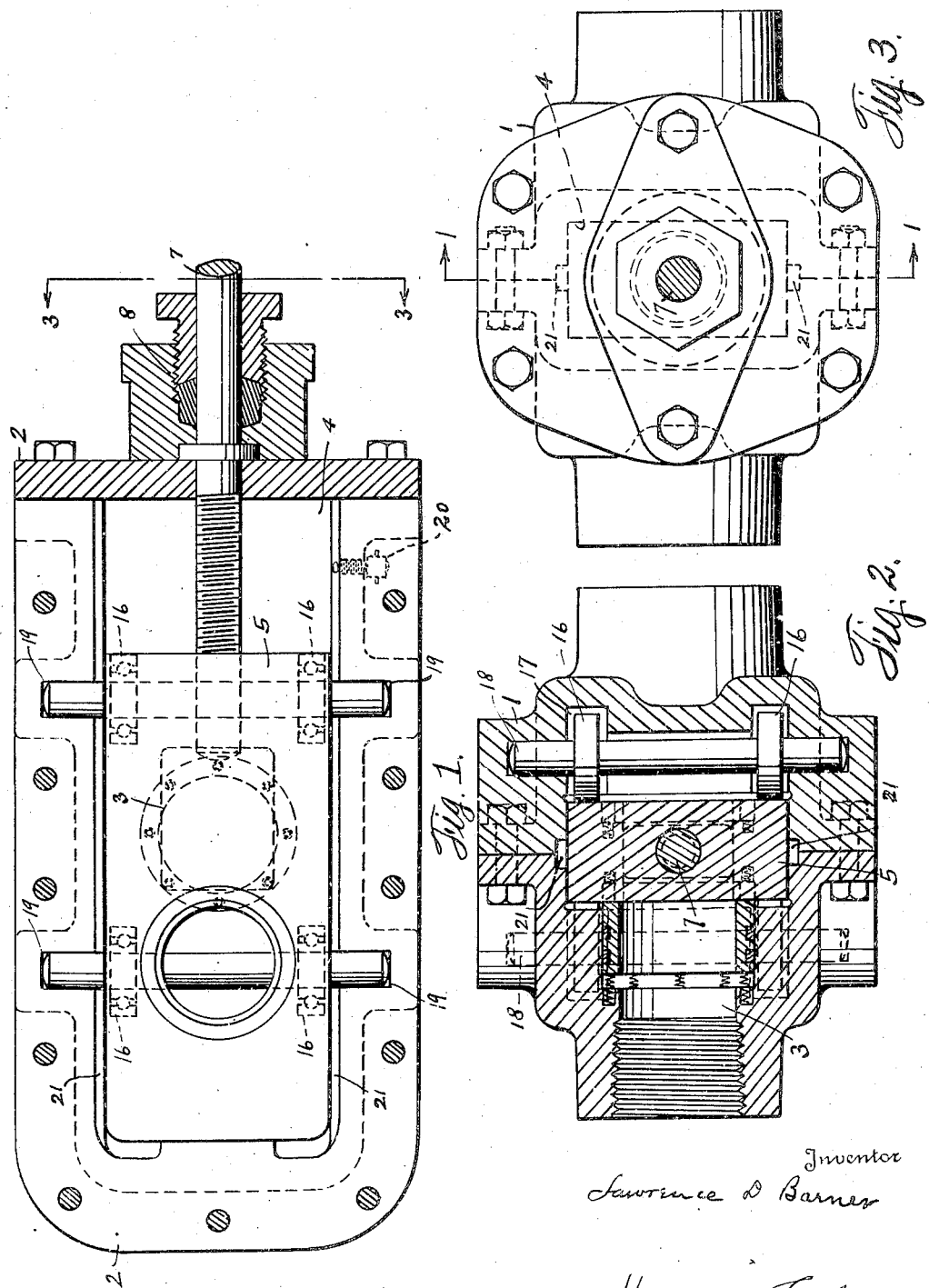
Inventor
Lawrence D Barner
By Hardway Tather
Attorneys

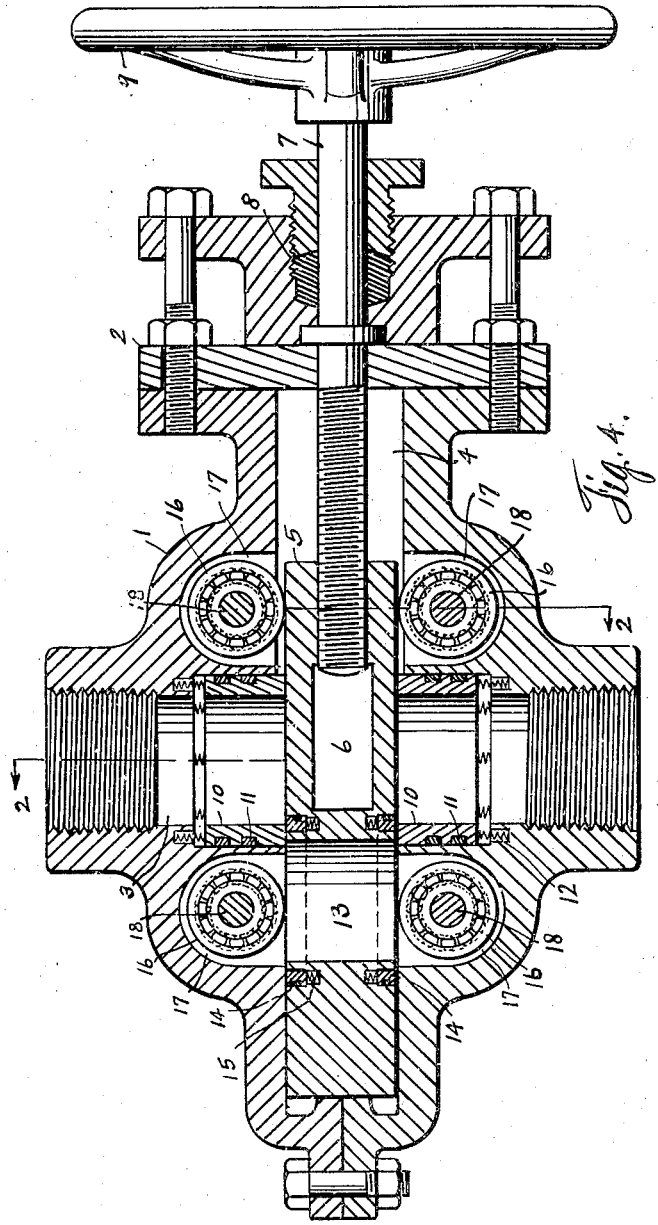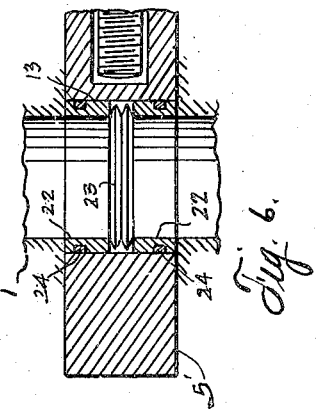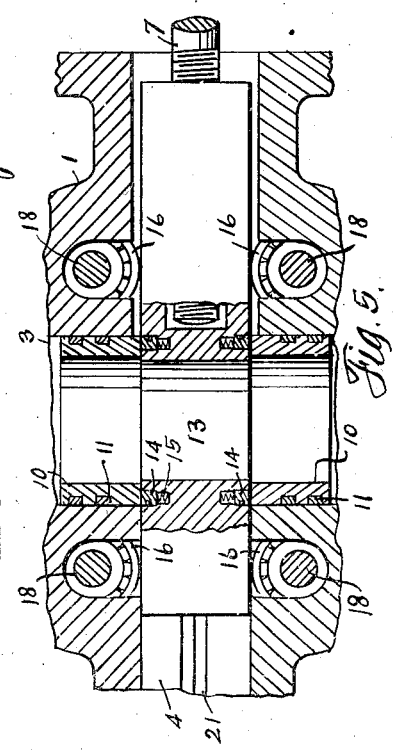

Patented Dec. 8, 1936

2,063,655

UNITED STATES PATENT OFFICE 2,063,655

VALVE MECHANISM

Lawrence D. Barner, Houston, Tex.

Application April 18, 1933, Serial No. 666,719

2 Claims. (Cl. 251—59)

This invention relates to valve mechanism.

An object of the invention is to provide a valve mechanism of the character described specially designed to be connected into a flow line and having a casing provided with a flow way therethrough and a valve in the casing movable into one position to close said flow way and into another position to form a continuous conduit through the valve casing.

The mechanism is also adapted to be connected to the upper end of a pipe in a well bore to form what is commonly known as a drilling valve.

Another object of the invention is to provide a valve mechanism of the character described equipped with tubular sealing means in yielding contact with the valve and effective to form a fluid tight seal between the valve and casing, and anti-friction guide means for the valve.

With the above and other objects in view the invention has particular relation to certain novel features of construction, operation and arrangement of parts, an example of which is given in this specification and illustrated in the accompanying drawings, wherein:

Figure 1 shows a longitudinal sectional view taken on the line 1—1 of Figure 3.

Figure 2 shows a cross sectional view taken on the line 2—2 of Figure 4.

Figure 3 shows a cross sectional view taken on the line 3—3 of Figure 1.

Figure 4 shows a longitudinal sectional view of the valve in closed position.

Figure 5 shows a fragmentary longitudinal sectional view, showing the valve in open position, and Figure 6 shows a fragmentary sectional view of a modified form of the valve.

Referring now more particularly to the drawings, wherein like numerals of reference designate similar parts in each of the figures, the numeral 1 designates the valve casing which is preferably formed of two similar complemental castings, bolted together and closed at one end and having the end-plate 2 closing the other end. The casing has the flow way 3 therethrough and is provided with the longitudinal valve guideway 4 therein across said flow way. This guideway 4 is preferably rectangular in cross sectional contour and mounted therein is similarly shaped valve 5. At one end this valve has a deep socket 6 provided with internal threads and threaded into said socket there is the operating rod 7. This rod works through, and has a swivelling connection with, the stuffing box 8 which is bolted to the end-plate 2 and the outer end of the rod has the hand wheel 9 thereon. By rotating the rod 7, the valve may be moved back and forth in the guideway 4. On opposite sides of the guideway 4 the flow way 3 is counter bored and seated in said counter bore are the seal rings 10 which have the surrounding packing rings 11 and these seal rings are seated on the coil springs 12 whereby they are held against the corresponding sides of the valve 5. The valve has the flow way 13 therethrough adapted to be brought into and out of registration with the flow way 3. Seated in opposite faces of the valve are the packing rings 14, 14 which surround the flow way 13 and are held yieldingly against the opposing walls of the casing by the yieldable springs 15.

On opposite sides of the flow way 3 are the anti-friction roller bearings 16, 16 which bear against the valve 5.

These roller bearings are housed within the recesses 17, 17 of the casing provided for them and are mounted to rotate on the transverse shafts 18, 18 whose ends work in the bearings 19, 19 provided in the casing to receive them. These rollers 16 are spaced a sufficient distance apart on their respective shafts to clear the flow way 13 and to ride against the corresponding margins of the valve as the valve is moved into active or inactive position as illustrated more clearly in Figures 1 and 2. These antifriction bearings conduce to the easy operation of the valve nothwithstanding the strong pressure of the fluid against it.

When it is desired to open the valve the rod 7 may be appropriately turned to move said valve to align the flow way 13 with the flow way 3, and a continuous conduit will thus be provided through the valve casing and when it is desired to close the flowway 3 the valve may be actuated into another position to close said flowway 3 and during the movement of said valve the seal rings 10 and the packing rings 14 will exclude the fluid flowing through said flow way 3 from the valve guideway 4 and from the bearings between which the valve moves to that no sand, grit or foreign matter can find its way into the valve casing.

The guideway 4 may be filled, and kept filled with, a non compressible, oil or liquid. This oil or other liquid may be supplied to the guideway through the valve controlled inlet connection 20. It will be noted that the opposite ends of the guideway 4 are connected by the channels 21 whereby the oil or liquid filling said guideway may flow around the valve 5 back and forth as said valve is reciprocated. This filler in the guideway will prevent the entrance of any gritty liquid into said guideway. By the application of a pressure pump to the connection 20 it can be readily ascertained whether the valve is leaking or not.

In Figure 6 a slightly modified form is shown wherein the valve 5' is shown equipped with the oppositely arranged sleeves 22, 22 which are fitted into the flow way 13 through said valve 5'. Between these sleeves 22 there is a spring 23 which holds the outer ends of the sleeves at all times in close contact with the walls of the casing on opposite sides of the guideway 4. These sleeves may have the surrounding packing rings 24 if desired.

The drawings and description disclose what is now considered to be a preferred form of the invention by way of illustration only while the broad principle of the invention will be defined by the appended claims.

What I claim is:

1. A valve mechanism comprising a valve casing having a passageway for liquid therethrough and having a valve guideway therein, a valve having an opening and slidable in said guideway into one position to close said passage and into another position to align said opening with said passage whereby a continuous conduit is provided through said casing, means in yielding contact with the casing, and housed within, the valve and forming a seal between the valve and casing, antifriction rollers housed in recesses in the casing against which the valve works and transverse shafts in the casing on which the rollers are mounted.

2. A valve mechanism comprising a valve casing having a fluid passage therethrough and having a valve guideway therein, antifriction rollers housed in recesses in the casing and on opposite sides of said guideway, a valve in said guideway between said rollers, said valve having an opening therethrough, means for moving the valve into active position to close said passage and into inactive position to align said opening with said passage, seal rings around said passage in yielding contact with opposite sides of the valve and seal rings housed within the valve and surrounding the valve opening and in yielding contact with the casing.

LAWRENCE D. BARNER.